Jan. 13, 1942.  A. L. SPANGENBERG  2,270,224
COCKPIT ENCLOSURE
Filed June 27, 1938  4 Sheets-Sheet 1

INVENTOR:
ALFRED L. SPANGENBERG.
BY
ATTORNEY

Jan. 13, 1942. A. L. SPANGENBERG 2,270,224
COCKPIT ENCLOSURE
Filed June 27, 1938 4 Sheets-Sheet 2
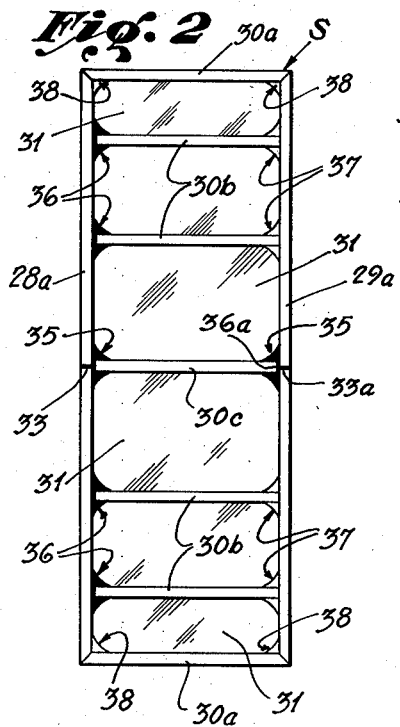
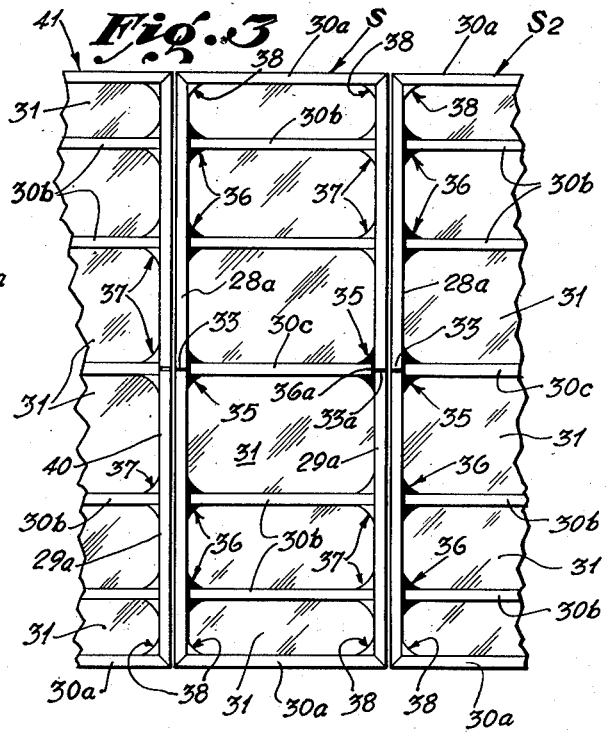
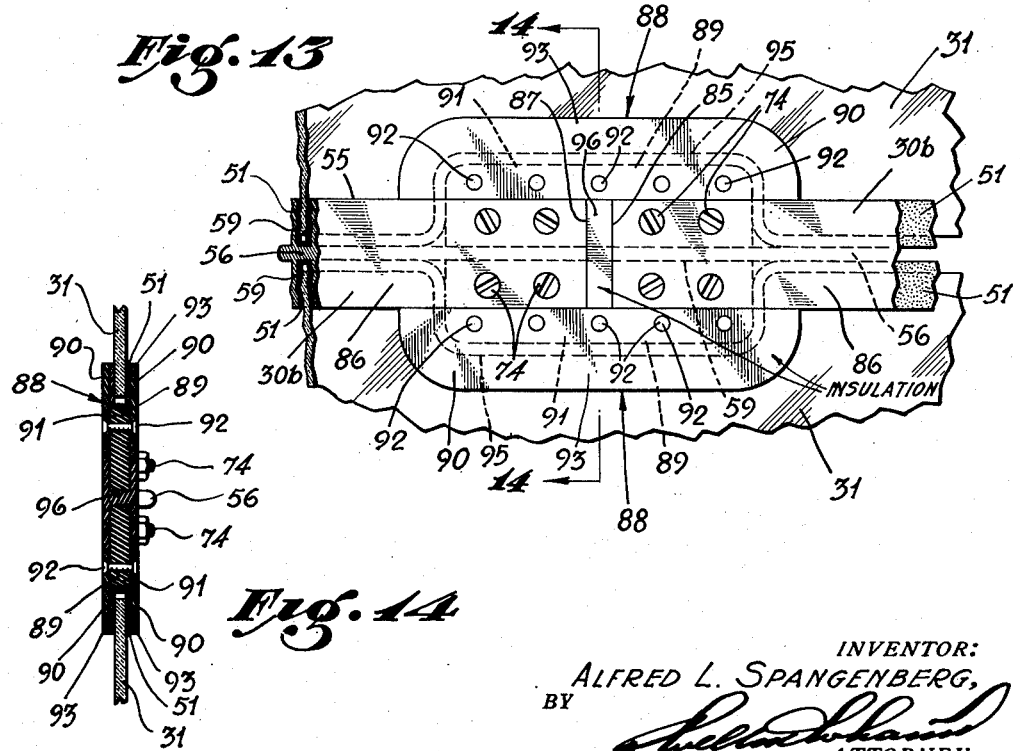
INVENTOR:
ALFRED L. SPANGENBERG,
BY
ATTORNEY

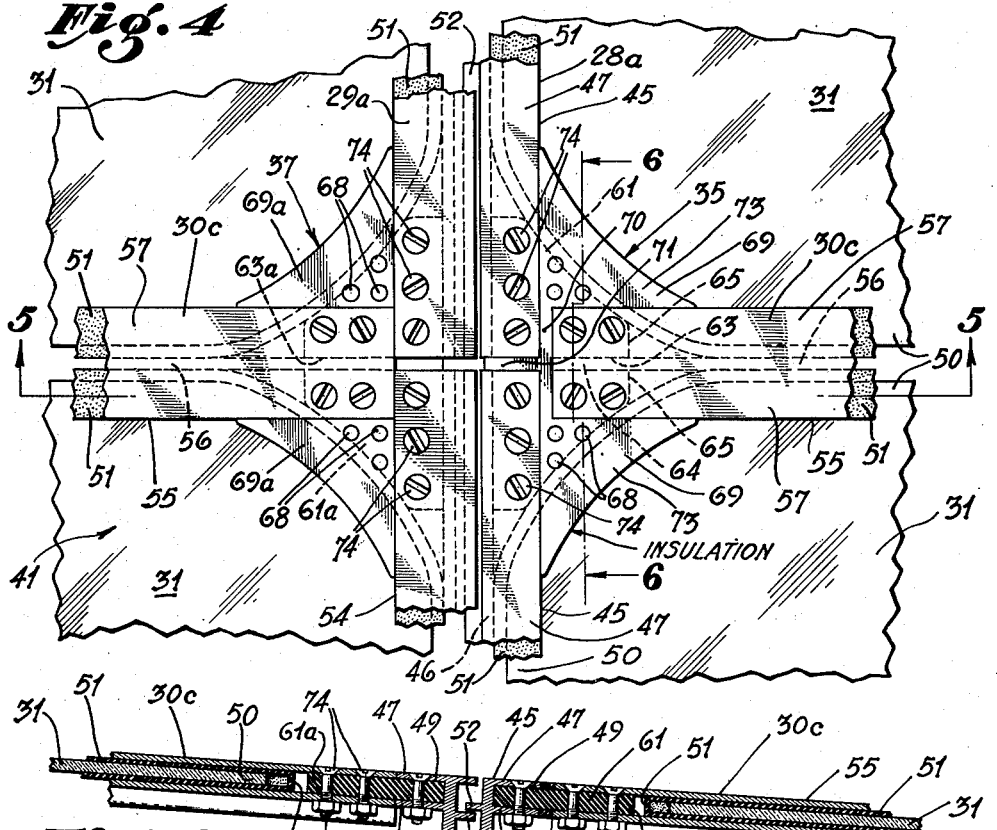
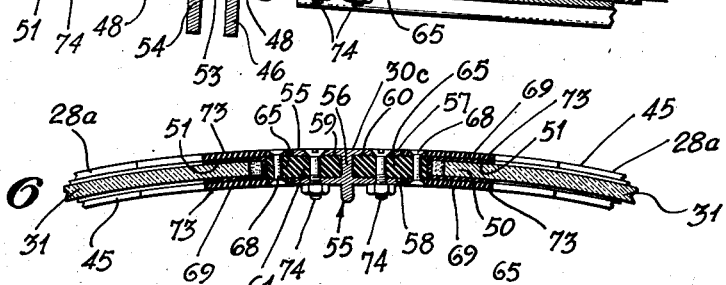
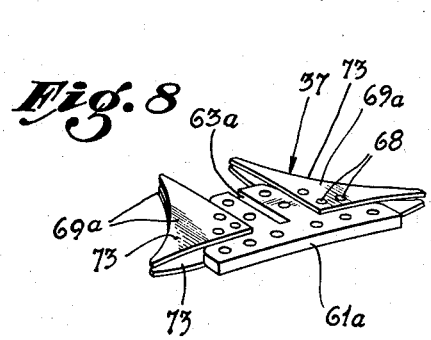

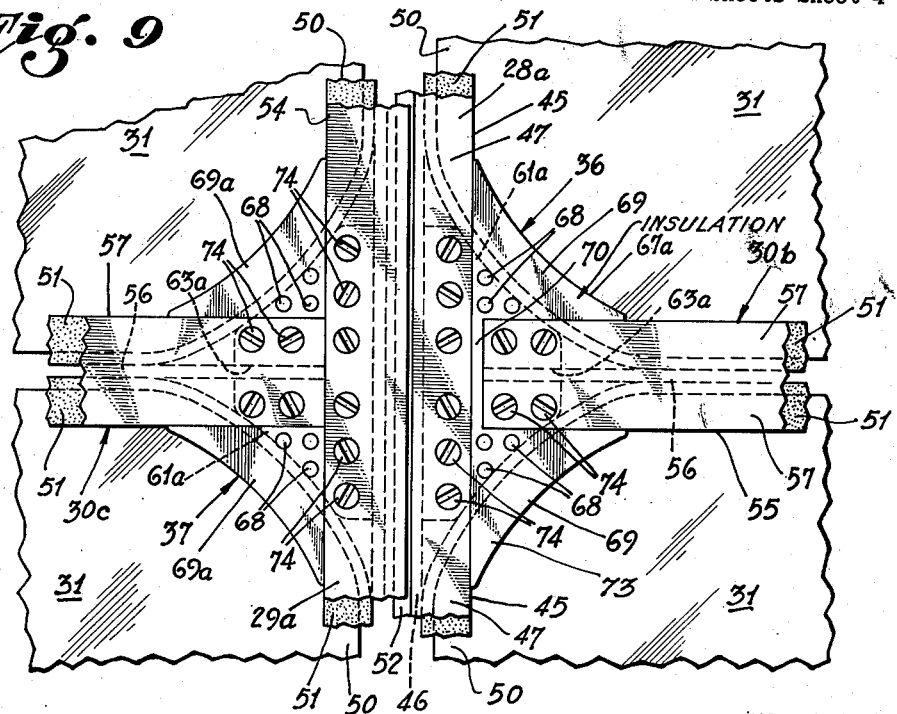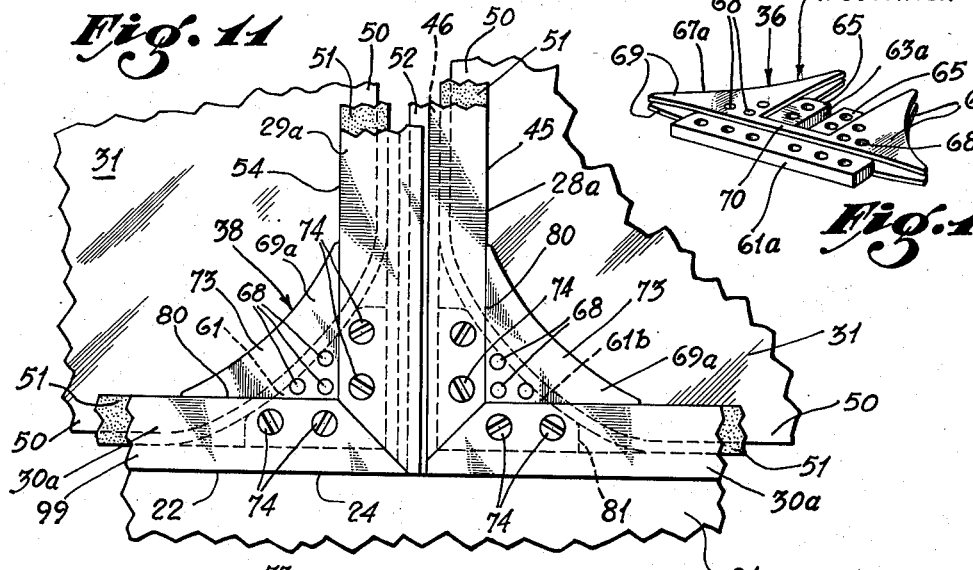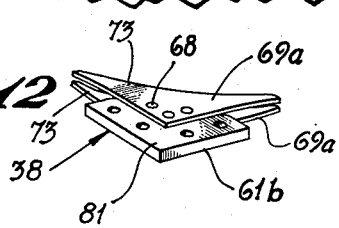

Patented Jan. 13, 1942

2,270,224

UNITED STATES PATENT OFFICE 2,270,224

COCKPIT ENCLOSURE

Alfred L. Spangenberg, Brentwood Heights, Calif., assignor to Douglas Aircraft Company, Inc., Santa Monica, Calif., a corporation of Delaware Application June 27, 1938, Serial No. 216,001

4 Claims. (Cl. 244—121)

My invention relates in general to aircraft having radio equipment, and relates in particular to simple and effective means for obtaining improved operation from radio equipment in aircraft.

Antennae located within the metal framework of aircraft, containing electrically closed circuits, are inductively shielded and mutually reactive to a degree such that radio signals are at least in part counteracted or directionally distorted by the circuits.

It is the principal object of the present invention to provide an aircraft which is so designed as to minimize inductive shielding of receptive or antenna circuits in radio equipment employed in aircraft. My invention makes it possible to satisfactorily employ in aircraft a loop antenna, herein referred to as a radio loop or antenna, within the metal shell of aircraft, such as, for example, the fabricated metal fuselage of an airplane.

It is an object of the present invention to provide, in an aircraft having radio equipment, the radio loop of which may be supported within the metal framework of the aircraft, an effective means whereby the inductive shielding of such loop, due to its enclosure by the framework, will be either avoided or will be minimized to a degree such that satisfactory performance of the radio equipment is attainable.

A further object of the invention is to provide, in an aircraft of the character described and which carries radio equipment, a body comprising a shell which may be formed of a substantially continuous fabricated metal wall, such as a fabricated metal framework, wherein at least one of the walls is fabricated in part from metal strips and in part from insulating material which is so placed relative to the metal that circuits which inductively shield the radio loop are practically avoided.

A further object of the invention is to provide for a wall, which is to be used in proximity to a radio loop, a novel frame formed essentially of metal members, which metal members form circuits which are open and are accordingly nonshielding with respect to the radio loop.

It is another object of my invention to provide a structure for use in adjacency of a radio antenna which includes a frame or metal members which form mechanical loops but which do not form electrical loops and therefore will not inductively shield the antenna.

Further objects and advantages of the invention will appear in the following part of the specification.

Referring to the drawings which are for illustrative purposes only:

Fig. 2 is a schematic view showing the characteristics of a preferred form of framework which may be employed in the practice of the invention.

Fig. 3 is a view similar to Fig. 2 but showing how adjacent or consecutive frames may be employed in the practice of the invention.

Fig. 4 is an enlarged fragmentary face view showing the joint construction employed in the position indicated by the loop 4 of Fig. 1.

Fig. 5 is a section taken as indicated by the line 5—5 of Fig. 4.

Fig. 6 is a section taken as indicated by the line 6—6 of Fig. 4.

Fig. 7 is a perspective view of a preferred form of insulator to be used in a center joint, such as disclosed in Fig. 4.

Fig. 8 is a perspective view of a connector used in opposition to the insulator shown in Fig. 7.

Fig. 9 is an enlarged fragmentary face view of the joint construction employed in the position indicated by the circle 9 of Fig. 1.

Fig. 10 is a perspective view of an insulator employed in Fig. 9.

Fig. 11 is an enlarged fragmentary face view of a corner joint, such as formed in the position indicated by the circle 11 of Fig. 1.

Fig. 12 is a perspective view of a corner connecting member.

Fig. 13 is an enlarged fragmentary face view showing an alternative form of insulator for a frame member.

Fig. 14 is a section taken as indicated by the line 14—14 of Fig. 13.

Figure 1:
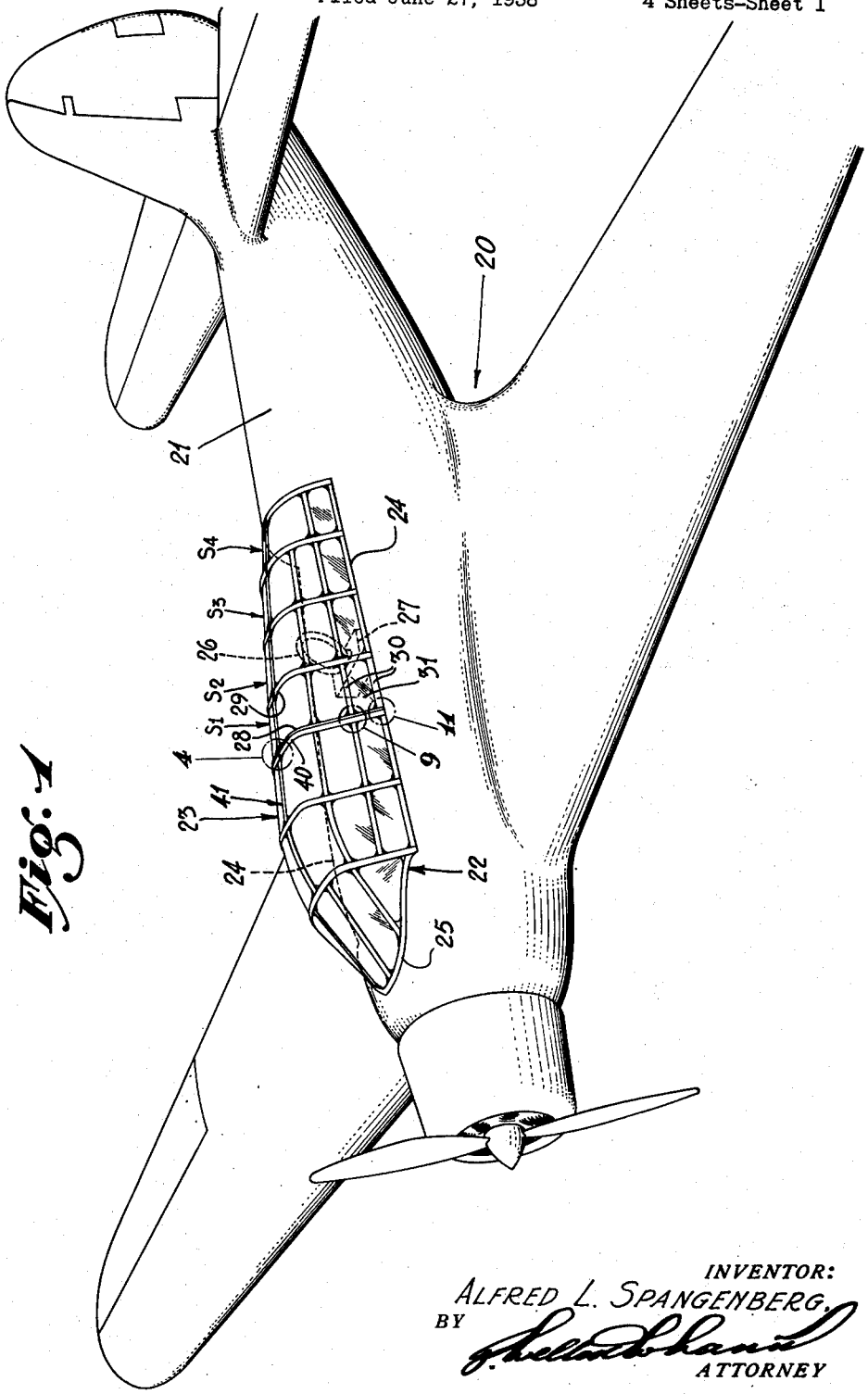
Fig. 1 is a perspective view showing how a preferred form of my invention may be embodied in an airplane.

Although the principles of my invention may be employed in various types of structures or craft, the most extensive use now contemplated therefor is in aircraft, such as the airplane 20 shown in Fig. 1, and which for the purpose of this disclosure may be of the all metal type having a body or shell 21 in which there is a cockpit opening 22 shielded or protected by a cockpit enclosure 23 preferably in the form of a wall consisting of a metal framework having a plurality of transparent panes supported thereby. This cockpit enclosure 23 is upwardly arched or of pronounced convex form so that it encloses a volume of space lying above the bounding edges 24 and 25 of the cockpit opening 22.

In the airplane cockpit, and positioned within the enclosure 23, I show a radio loop antenna 26 forming part of radio equipment indicated by dotted lines 27. That portion of the wall of the enclosure 23 lying in proximate relation to the loop 26 is formed so that inductive circuits will not be formed therein. In the present illustration of the invention I show adjacent wall or frame sections S1, S2, S3, and S4, one or more of which may, if desired, be slidable so as to provide door means giving access to the cockpit. The section S1 includes spaced metal bar or rib members 28 and 29 which extend from one cockpit edge 24 to the other edge 24, and are convexly arched so that they will contribute to the formation of a domed enclosure 23. These members 28 and 29 are connected together by means of cross-bars 30, defining panels in which transparent panes 31 are secured, these panes being preferably made of a non-shatterable material, such as "plexiglass."

In Fig. 2 I show diagrammatically a frame section S to represent the general characteristics incorporated in the sections S1, S2, S3, and S4 of Fig. 1. In this frame section S there is an outer or major frame comprising sides 28a and 29a and ends 30a. This outer frame 32, being made of metal bars, would form an electrically closed circuit were it not for the fact that the side 28a is cut as at 33. A circuit is formed by the side 29a and the metal fuselage by which the ends 30a are supported. Therefore the side 29a is broken or opened at 33a and the cross-bar 30c is separated from the side 29a or opened at 36a as in Fig. 2. Frame members such as 29a, when electrically connected to a metal fuselage, form closed circuits concentrically with the longitudinal axis of the fuselage and the radio apparatus; and members such as 28a, 29a, 30a, 30b, when electrically connected to one another, form closed circuits lying in geometric planes substantially parallel with the axis as well as in more or less angular relation to the antenna.

Within the outer frame S2 a number of inner frames or panels are formed by cross-bars 30b and 30c, these frames or panels forming a plurality of inner or minor circuits which are opened by cutting each of them in at least one point. To accomplish this opening of the minor circuits, insulated connectors 35 and 36 are employed to connect at end of each cross-bar to either the side 28a or the side 29a of the frame 32, it being preferable to connect the ends of the bars 30b and 30c in insulated relation to the side 28a which is cut at 33. The side 29a of the frame 32 may be connected to the cross-bars 30b by means of connectors 37, and corner connectors 38 may be employed to connect the ends of the members 30a to the ends of the sides 28a and 29a. The connectors 35, 36, 37, and 38 are shown respectively in Figs. 7, 10, 8, and 12, their construction and manner of use to be later described in detail herein.

Where a frame, such as shown in Fig. 2, is to be disposed adjacent another frame or in contact with metal structure which would bridge across the gap 33 in the side 28a thereof, the expedient shown in Fig. 3 may be followed. Therein I show the side 28a in contact with a metal bar or rib 40 of adjacent framework. For example, this rib 40 may be the rear member of the front section 41, Fig. 1, of the enclosure 23 which is engaged by the rib 28 of the section S1. This rib 40, Fig. 3, in contacting both portions of the side or rib 28a would bridge the gap 33 and would close the outer or major circuit formed by the frame 32 of section S were it not for the fact that the rib 28a has been broken at 33a as the result of the use of an insulating connector 35 at the rightward end of the cross-bar 30c. If a metal structure, such as section S2 of Fig. 1, is to be placed in contact with the side 29a of the section S, Fig. 3, the same should be formed in a manner complementary to the section S so that the gap 33a will not be bridged. Accordingly, section S2 is shown with a side 28a which is broken at a central point, so as to match the position of the gap 33 in the side 29a of section S. If the section S2 is made a counterpart of the section S, it may be brought into engagement with the side 29a without bridging the gap 33a, and accordingly without closing the outer circuit formed by the outer frame of the section S. It will be perceived, accordingly, that if the sections S1, S2, S3, and S4 are constructed in the manner illustrated in Figs. 2 and 3, the outer and inner circuits of such sections will be open and will be substantially free from shielding influence on the radio loop 26.

Figs. 4 to 12 inclusive show details of construction used in the preferred manner of making the non-shielding wall sections S1, S2, S3, and S4. As shown in Figs. 4 and 5, the side 28a comprises a rolled structural member 45 comprising a web 46 with parallel flanges 47 and 48 extending from the upper portion thereof so as to form a channel 49 of such width as to receive the edge 50 of a pane 31 and a sealing strip 51 of resilient or rubbery material which is folded over the edge 50 of the pane 31. The member 45 has a rib 52 projecting from the web 46 so as to lie in overlapping relation to a flange 53 which projects from the rolled structural members 54 forming the rib or bar 40 of the front section 41 of the enclosure 23.

The cross-bars 30b and 30c are formed of double-channel members 55 having a central web 56 with opposed pairs of flanges 57 and 58 forming channels 59 and 60 to receive the edges of adjacent panes 31. The end members 30a, as shown in Fig. 11, are of single-channel type, being in this respect similar to the members 45 shown in Figs. 4 and 9. The insulating connector 35, for connecting a central cross-bar 30c to the side 28a of the outer frames of section S, is constructed as shown in Figs. 4 and 7 so as to connect three channeled metal frame members together in such manner that they will not make electrical contact. Such insulating connector 35 includes a filler block 61 of such thickness as to fit snugly into the channels 49 of the members 45, as shown in Fig. 4, there being a lug 62 projecting from the edge of the filler piece 61 so as to lie between the ends of the members 45. In alignment with the lug 62 the filler block 61 has a slot 63 to receive the end portion 64, Fig. 4, of the web 56 of the member 30c, the portions 65 lying on the opposite sides of the slot 63 being thus disposed so as to project into the end portions of the channels 59 and 60 of the member 30c. The filler block 61 is made of a durable insulating material, such, for example, as fabric Bakelite, and to the upper and lower faces thereof plates 67 are secured by means of rivets 68, such plates 67 being likewise formed of a durable insulating material and having such configuration as to form cooperating sections 69 which are substantially triangular and which are connected by strips 70 placed so as to lie between the ends of the member 30c and the end portions of the adjacent members 45, as shown in Fig. 4. Strips 71 extend from the centers of the strips 70 so as to project over the upper and lower faces of the lug 62. The strips 71 and 71 form ribs on the upper and lower faces of the filler block 61. The sections 69 of the plates 67 are of such size that they project beyond edges of the filler block 61, thereby forming flanges 73 to receive the corner edges of the panes 31, when the insulating connector 35 is secured to the parts 30c and 45 by suitable means, such as screws 74, which pass through openings in the flanges of these members and in the filler block 61.

As shown in Fig. 9, the end of a member 30b may be connected to the inner portion of a member 45 by means of an insulating connector 36 which is essentially the same as the insulating connector 35, with the exception that it omits the projecting lug 62 and the dividing strips or ribs 71. This connector 36, as shown in Fig. 10, has a filler piece 61a with a slot 63a therein to receive the web 56 of a member 30b. The plates 67a which are riveted to the opposite faces of the filler block 61a comprise triangular sections 69 connected by strips 70 which form ribs on the upper and lower faces of the filler block 61a to lie between the end of the member 30b and the flanges 47 and 48 of the channel member 45.

In Fig. 8 I show a connecting member 37 for connecting the end of a cross-bar 30b or 30c to a side bar of channel form in non-insulating relation thereto. This member 37 has a filler piece 61a with a slot 63a, but this connector 37 differs from the connector 36 in that the slot 63a thereof is deeper than the slot 63 of Fig. 10 and the strips 70 are omitted, triangular plates 69a being secured by means of rivets 68 to the upper and lower faces of the filler block 61a. This connector 37 need not be made of a dielectric material, but in ordinary practice it is found advisable to make the same of a material, such as fabric Bakelite, thereby utilizing the vibration damping effect of this material in the non-insulated joints between the frame members.

In Figs. 11 and 12 I show the corner connector 38 for channel type frame members which are joined at the corners of a section S, the same consisting of a filler block 61b which is substantially in the form of a right triangle having the acute angled corners cut off with substantially triangular plates 69a secured thereto, by means of rivets 68, in position to occupy the corner spaces 80 formed by the joinder of the members 45 and 30a, as shown in Fig. 11, and so as to provide flange portions 73 which project over the adjacent edges of the pane 31. The filler block 61b has an exposed portion 81 of L-shaped form which extends into the adjacent ends of the channels of the members 45 and 30a and is secured therein by means of pairs of screws 74 which pass through the flanges and exposed portion 81 of the filler block 61b. The connector 38 is likewise preferably formed of a non-metallic material.

In Figs. 13 and 14 I show a manner in which frame members may be cut intermediate their ends for the purpose of opening a frame circuit at a place other than at points of intersection. A cross-member 30b of double-channel form is cut at 85 so as to form of the member 30b adjacent sections 86 separated by a space 87. To connect the ends of the sections 86, connectors 88 are placed on opposite sides of and in centralized relation to the space 87, each of these connectors comprising a filler block 89 of substantially rectangular form and being of such thickness as to fit snugly in the channels 59 of the sections 86 and on opposite sides of the webs 56 thereof. Plates 90 are secured to the exposed portions 91 of the filler blocks 89 by means of rivets 92, such plates 90 being of a size to form projecting flanges 93 which overlie edges of adjacent panes 31 and the sealing strips 51 which are folded over the edges of these panes 31 which are cut, as indicated by dotted lines 95 in Fig. 11, so as to pass around the filler blocks 89. The filler blocks may be secured in the channels 59 by means of screws 74. The filler blocks 89 and the plates 90 are formed of a durable insulating material, such as hereinbefore described, and the space 87 is filled by an H-shaped member 96 of insulating material.

In Figs. 4, 5, 6, 9, and 11 connector members 37 and 38 are shown as means for connecting the rib members 40 of the front section 41 to channel members 98 and 99 which are respectively similar to the members disclosed at 30c and 30a in Figs. 4 and 11. It will be understood that the front section 41 of the enclosure 23 is not constructed so as to be insulated against the formation of shielding circuits, for the reason that this front section 41 is spaced at a distance from the radio loop 26 which is preferably disposed within that part of the dome shaped enclosure 23 defined by the insulated sections S1, S2, S3, and S4.

As an illustration of a practical embodiment of my invention I have chosen a cockpit enclosure for an airplane. It should be understood, however, that my invention is not limited to the details of construction disclosed herein, nor is my invention limited to use in cockpit enclosures, but may be employed in other structures where inductive radio antenna shielding is a problem. I wish my invention to be construed in accordance with the statement of invention and appended claims.

I claim as my invention:

1. In a radio equipped aircraft of the character described, a body comprising a shell having an opening leading into an interior space, a radio loop in said space, a wall forming a closure for said space including a plurality of panes supported by a framework of metal bars having edge channels to receive the edges of said panes, means connecting said bars together in a non-conducting relation and each comprising a filler member of insulating material adapted to fit into the channels of adjacent bars, and flange means extending from said filler member so as to overlie the edge portion of a proximate pane.

2. In a radio equipped aircraft of the character described, a body comprising a shell having an opening leading into an interior space, a radio loop in said space, a wall forming a closure for said space including a plurality of panes supported by a framework of metal bars having edge channels to receive the edges of said panes, means connecting said bars together in a non-conducting relation and each comprising a filler member of insulating material adapted to fit into the channels of adjacent bars, and flange means extending from said filler member so as to overlie the edge portion of a proximate pane, there being ribs on said filler member to insulate the adjacent portions of the bars which said filler member connects.

3. In an aircraft, a fuselage structure of metal rigidly connected together and adapted to transmit stresses from one portion thereof to another portion thereof, means defining an opening in one side of said fuselage to serve as a cockpit, an enclosure for said cockpit, the surface thereof merging into the surface of the fuselage and cooperating therewith to form a single substantially streamline body, said enclosure consisting of a grill-like framework of relatively narrow metallic strips forming window openings, and panels of non-conducting material in said openings, said strips being joined together directly in part, and bodies of dielectric material joining said strips together in part so that all circuits in said framework will be broken, whereby a radio loop may be placed within said enclosure without being shielded from radio signals.

4. In an aircraft, a fuselage structure of metal rigidly connected together and adapted to transmit stresses from one portion thereof to another portion thereof, means defining an opening in one side of said fuselage to serve as a cockpit, a radio in said fuselage having a loop antenna in said fuselage, an enclosure for said cockpit, the surface thereof merging into the surface of the fuselage and cooperating therewith to form a single substantially streamline body, said enclosure consisting of a grill-like framework of relatively narrow metallic strips forming window openings, and panels of non-conducting material in said openings, said strips in that part of the framework adjacent to said loop antenna being joined together directly in part, and connectors of dielectric material joining said strips together in part so that all circuits in said part of said framework will be broken, whereby said loop antenna may be located within said enclosure without being shielded from radio signals.

ALFRED L. SPANGENBERG.